US006366670B1

(12) United States Patent
Davis et al.

(10) Patent No.: US 6,366,670 B1
(45) Date of Patent: *Apr. 2, 2002

(54) CALL RELATED INFORMATION RECEIVER UNIT

(75) Inventors: Paul Joseph Davis, Chesterbrook; James A. Johanson, Emmaus; Vasu Iyengar, Allentown; James Charles Popa, North Whitehall Township, Lehigh County; Glenn A. Ehrich, Wescosville, all of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/058,203

(22) Filed: Apr. 10, 1998

(51) Int. Cl.[7] .............................. H04M 1/00; H04M 1/56
(52) U.S. Cl. ............................ 379/387.01; 379/142.08; 379/406.01
(58) Field of Search ................................. 379/93.23, 127, 379/142, 164, 183, 215, 283–284, 338–339, 376–377, 392–393, 406, 410–411, 417–418

(56) References Cited

U.S. PATENT DOCUMENTS 5,263,084 A    11/1993  Chaput et al. ............... 379/215
5,583,924 A  * 12/1996  Lewis .......................... 379/142
5,600,714 A  *  2/1997  Eppler, Jr. et al. ........... 379/406
5,836,009 A  * 11/1998  Diamond et al. ........ 379/93.23
5,901,212 A  *  5/1999  True et al. ................... 379/142
5,943,407 A  *  8/1999  Davis et al. ................. 379/142
5,946,384 A  *  8/1999  Yee et al. .................... 379/142
6,009,158 A  * 12/1999  Romero ...................... 379/142

* cited by examiner

Primary Examiner—Stella Woo
Assistant Examiner—George Eng
(74) Attorney, Agent, or Firm—William H. Bollman

(57) ABSTRACT

An adjunct Type II caller ID/call waiting (CIDCW) receiver unit is provided which has a greatly improved ability to detect tones and other call related information on a telephone line from a central office while the customer premises equipment is in an off-hook condition. The inventive adjunct CIDCW receiver unit is placed in series between the telephone line from the central office and the customer premises equipment, rather than in parallel with the customer premises equipment as in conventional adjunct CIDCW receiver units. A second telephone line interface (TLI) is included in the adjunct CIDCW receiver unit for connection to the customer premises unit to simulate the impedance of the telephone line. The adjunct CIDCW receiver unit has the ability to disconnect, mute or suppress the microphone signal from the customer premises equipment from being included in the signal received by the call related information receiver portion of the adjunct CIDCW receiver unit.

22 Claims, 6 Drawing Sheets

CALL RELATED INFORMATION RECEIVER UNIT

This application claims priority from U.S. application Ser. No. 08/991,482 now U.S. Pat. No. 5,943,407 entitled "Performance Enhancement Of Tone Detection And FSK Detection Using Hybrid Echo Cancellation" filed on Dec. 16, 1997.

BACKGROUND OF THE INVENTION

1. Field of the Invention

This invention relates to the enhanced detection of non-voice information on a telephone line by an adjunct call related information (e.g., Caller ID) unit associated with customer premises equipment. More particularly, it relates to the ability to eliminate or suppress voice signals at an adjunct call related information receiver unit while the associated customer premises equipment is in an off-hook condition, allowing improved detection of the call related information.

2. Background of Related Art

Call information is useful to users of a telephone system. For example, a well known and popular call information service provided in the United States is Calling Identity Delivery (Caller ID). This service typically provides the telephone number and household name information of a calling party to the called party before the call is answered. Based on a display of the call information, the called party may decide not to answer the incoming call. Basic call information such as Caller ID information is transmitted from the local telephone company to the called party while the called party's telephone is in a hung-up or on-hook state, e.g., between the first and second rings.

Another telephone company service which has become well known and popular is that which allows a third party to call while the telephone is off-hook, currently implemented in the United States in Call Waiting services provided by telephone companies. Call waiting allows someone who is already using the telephone (i.e., in an off-hook state), to receive an audible interruption, click or other indication at the customer premises equipment that another person is calling, and then to establish a connection with the third party caller without hanging up on the first party.

More recently, call information has been combined with third party caller services to provide an advanced service currently known as Calling Identity Delivery on Call Waiting (CIDCW) in the United States. CIDCW service allows a customer, while off-hook on an existing call, to receive information about an incoming calling party on a waited call before answering that incoming call waiting call. A customer premises equipment (CPE) Alerting Signal (CAS) is transmitted to the CPE to indicate the availability of call related information. The CAS is a short burst of a combination of high frequencies that are appended to the Subscriber Alerting Signal (SAS) otherwise known as the 'Call Waiting Tone'. Using CIDCW, a user can decide whether or not to take the incoming call waiting call.

Customer premises equipment capable of receiving on-hook call information such as Caller ID (CID) including Calling Number Delivery (CND) and Calling Name Delivery (CNAM), is generally referred to as Type I customer premises equipment. Customer premises equipment additionally capable of receiving call information when off-hook or already in an established call with another party (CIDCW) is generally referred to as a Type II customer premises equipment. With Type II customer premises equipment and Caller ID service, the called party is alerted to the availability of call information for an incoming call waiting call with an alerting CAS tone. The alerting CAS tone is acknowledged with a DTMFD, and the FSK data corresponding to the call information follows from the central office to the customer premises equipment.

In the United States, FSK call information such as Caller ID generally is not transmitted in conventional schemes by the central office unless an acknowledge (ACK) signal is received from the customer premises equipment. Of course, the call information may be transmitted without implementation of an acknowledge signal. The central office typically silences the far-end party's voice path before the alerting CAS sequence is provided. Likewise, Type II call related information receivers which are integrated with customer premises equipment (hereinafter "integrated CIDCW units") mute the handset (or microphone and speaker of a speakerphone) before sending the ACK signal. The central office sends FSK caller ID call information using the signaling protocol described in Bellcore recommendation TR-NWT-000030. Upon completion of the transmission of the FSK call information, or if no ACK signal is received by the central office from the integrated CIDCW unit, the central office restores the far-end party's talking path. The integrated CIDCW unit restores handset (or microphone and speaker) operation upon completion of the reception of the FSK call information.

At any time after a called party having CIDCW service has been alerted to the availability of call information for an incoming call waiting call and while a party is still in the waited state, CIDCW allows the customer to flash the switch hook to retrieve the waited call, and subsequently to go back and forth between the current far-end party and the held party by flashing. CIDCW provides all the capabilities associated with the current CW service, with the additional capability of providing CID data to a customer on waited calls. Therefore, CIDCW is considered an enhancement of the CW service. A telephone line may either have call waiting (CW) or CIDCW service enabled, but not both at the same time.

There is a concern regarding the ability of Type II call related information receiver units (i.e., CIDCW receiver units), whether integrated with or adjunct to the customer premises equipment, to accurately and reliably detect call related information, e.g., alerting CAS tones and subsequent FSK data. This is because the Type II equipment, when in an off-hook condition, may carry a conversation or other information between at least two parties while the alerting CAS tones are received. Thus, it is very possible for voice signals of the conversation to interfere with the call related information, e.g., the alerting CAS tones indicating the availability of call information for an incoming call waiting caller.

FIG. 4 shows the approximate long-term average spectral energy density for continuous speech, indicating that high relative spectral energy is present in near-end speech, which is in the same general range as the alerting CAS tones used to transmit call information such as Caller ID. The presence of speech adds complexity to algorithms employed to detect the alerting CAS tones and, in fact, can cause a false detect (i.e., talkoff) or missed detects (i.e., talkdown) of an alerting CAS tone signal. Thus, conversation can interfere significantly with the reception of call related information at a conventional adjunct CIDCW receiver unit, causing erroneous detection or non-detection of the alerting CAS tones, and erroneous reception or non-reception of call related information such as a telephone number and household name of the incoming call waiting party.

CIDCW data is received when a telephone is off-hook (i.e., in use). To guarantee that the frequency shift keying (FSK) data transmitted after the alerting CAS tones by the central office are not corrupted by conversation, Bellcore recommendation FSD 01-02-1090 suggests muting of the microphone at the customer premises equipment upon detection of the alerting CAS tone sequence, and maintaining the muting until the call information for the call waiting caller is received. Conventional CIDCW customer premises equipment follows the Bellcore recommendation FSD 01-02-1090 (which, in its entirety, is explicitly incorporated herein by reference). For instance, U.S. Pat. No. 5,263,084 and other conventional integrated customer premises equipment systems mute the microphone at the customer premises equipment by switching the microphone out of electrical connection with the customer premises equipment upon detection of the alerting sequence of CAS tones. However, the muting of the alerting CAS tones is not possible in a CIDCW receiver unit because the CIDCW receiver unit does not know, a priori, when the alerting CAS tone will be transmitted. Thus, conventional CIDCW units require the detection of call related information, e.g., at least the alerting CAS tones, in the possible presence of near-end speech.

FIGS. 5 to 7 show a conventional adjunct CIDCW receiver unit 500 in more detail.

In particular, FIG. 5 shows the RJ-11 type connections in a conventional adjunct CIDCW receiver unit 400, both for the customer premises equipment, e.g., a telephone 402, and for the telephone line 404. With these two connections 402, 404, the conventional adjunct CIDCW receiver unit 400 would appear to 'intercept' the signal between the telephone line and, e.g., the telephone. However, this is not the case.

FIG. 6 shows the actual electrical connection of the telephone line between a central office 504, an adjunct CIDCW receiver unit 500, and a telephone 502. The adjunct CIDCW receiver unit 500 is merely 'tapped off' the telephone line at node 506, the two RJ-11 type connectors 402, 404 shown in FIG. 5 being generally for the convenience of the user, to avoid the need for a three-way telephone line tap at node 506. Thus, in conventional adjunct CIDCW receiver units, a direct connection remains between the telephone 502 and the central office 504.

FIG. 7 shows the conventional adjunct CIDCW receiver unit 500 in more detail. In particular, the conventional adjunct CIDCW receiver unit 500 includes a telephone line interface (TLI) 506, and a call related information portion including a codec 524, a digital signal processor (DSP) 520, and a display 544.

The TLI 506 comprises a hybrid or other conventional interface hardware for presenting the proper impedance to the telephone line from the central office 504. The input of the TLI 506 is connected to the telephone line from the central office 504, while the output of the TLI 506 is connected to the codec 524 of the CIDCW receiver unit 500. The codec 524 may be integrated within the DSP 520 or may be separate therefrom.

The DSP 520 is adapted to perform conventional software routines in a CIDCW functional block 540, e.g., FSK demodulation in an FSK demodulator 542a, tone detection in a tone detector 542b, and tone generation in a tone generator 542c.

The display 544 is adapted to display the pertinent call related information, e.g., the telephone number and/or household name of the calling party.

A keypad (not shown) may be included in the adjunct CIDCW receiver unit 500 to, e.g., allow the user to scroll through a log of previously received call related information on the display 544.

Accordingly, conventional telephone equipment including an integrated CIDCW receiver unit can disconnect or otherwise mute the microphone of a handset or a speakerphone to allow accurate and reliable detection of call related information, e.g., CIDCW FSK data, but only after the initial alerting CAS tones have been detected. Thus, conventional adjunct CIDCW receiver units must analyze the call related information together with possible voice data, reducing the reliability and/or accuracy of the reception of the call related information.

There is thus a need to improve the talkoff (i.e., false detects) and talkdown (i.e., missed detects) performance of adjunct CIDCW receiver units.

SUMMARY OF THE INVENTION

In accordance with the principles of the present invention, an adjunct call related information receiver unit comprises a first telephone line interface, and a call related information processor adapted to receive call related information.

A method of receiving call related information in an adjunct call related information receiver is also provided in accordance with the principles of the present invention. The method comprises inserting the adjunct call related information receiver in series between a telephone line from a central office and an associated customer premises equipment. A signal relating to the customer premises equipment is canceled from a signal received from the telephone line, and the call related information is received in a call related information processor.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention places an adjunct CIDCW receiver unit comprising two telephone line interfaces (TLIs) in series between the telephone line from the central office and the customer premises equipment, e.g., a telephone, rather than in parallel as in conventional adjunct CIDCW receiver units. The series interconnection allows the inventive adjunct CIDCW receiver unit to disconnect, mute or suppress the microphone signal from the customer premises equipment from being included with the signal analyzed by the call related information receiver portion of the adjunct CIDCW receiver unit.

Figure 1:
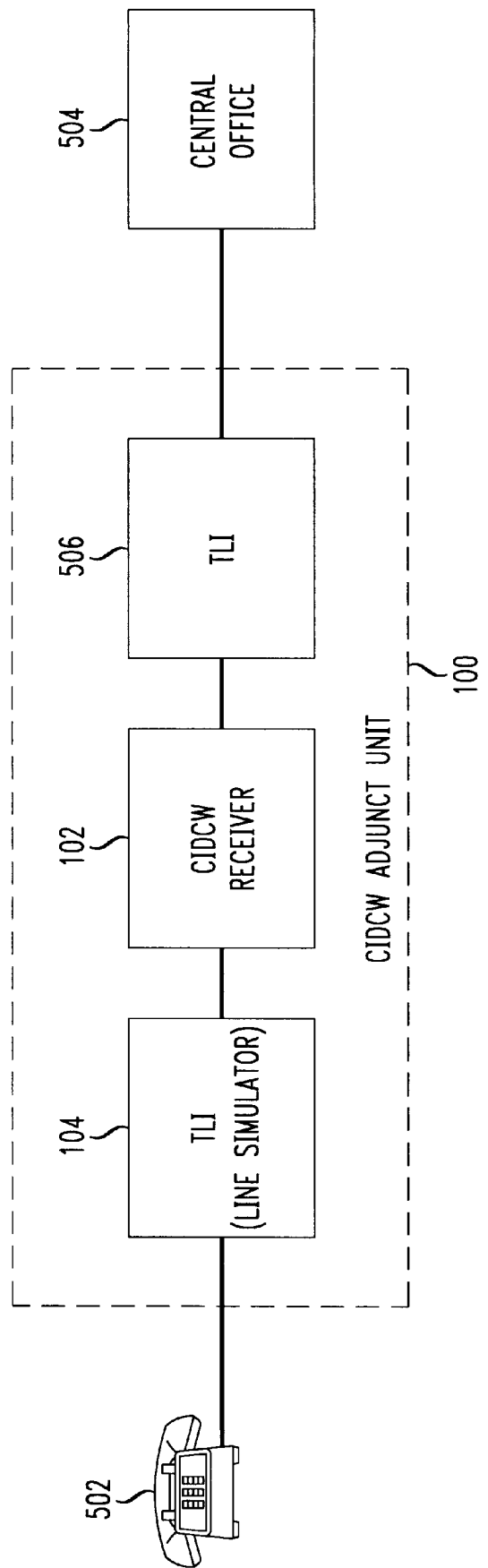
FIG. 1 shows an adjunct Caller ID Call Waiting (CIDCW) receiver unit in accordance with the principles of the present invention.

FIG. 1 shows an exemplary embodiment of an adjunct CIDCW receiver unit 100 in accordance with the principles of the present invention.

In particular, the adjunct CIDCW receiver unit 100 includes two telephone line interfaces (TLIs) 104 and 506, together with a CIDCW receiver 102. The first TLI 506 is placed on a line-side of the CIDCW receiver 102, and the second TLI 104 is placed on the customer premises equipment or phone-side of the CIDCW receiver 102.

The adjunct CIDCW receiver unit 100 is adapted to be placed in series between the telephone line from the central office 504 and the customer premises equipment, e.g., a telephone 502 such that the telephone 502 is not connected directly to the telephone line from the central office 504.

Figure 2:
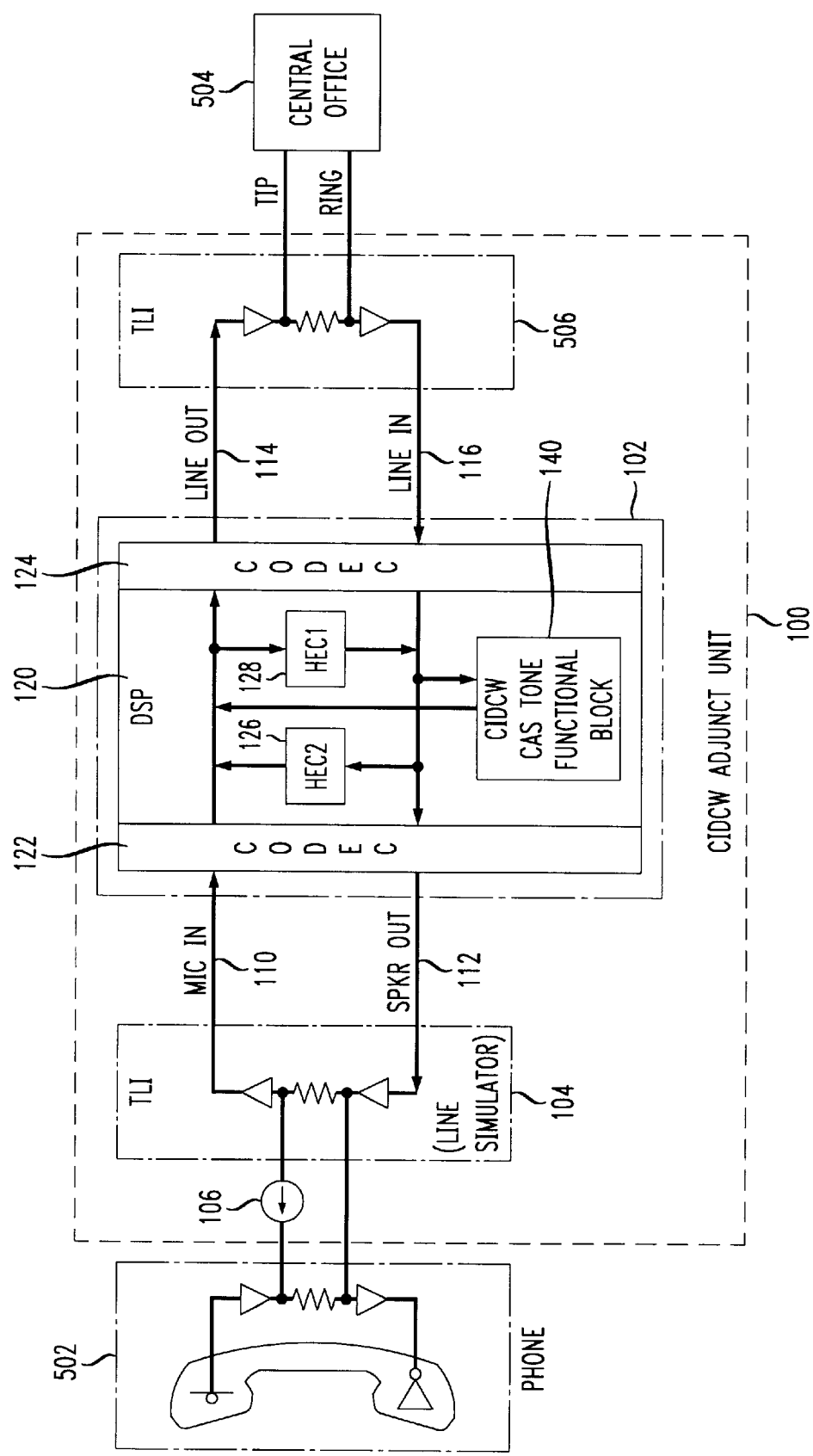
FIG. 2 shows the adjunct CIDCW receiver unit in FIG. 1 in more detail.

FIG. 2 shows the line-side TLI 506, the phone-side TLI 104, and the CIDCW receiver 102 in more detail. In particular, the CIDCW receiver 102 includes a first codec 124 on the line-side, a second codec 122 on the phone-side, first and second hybrid echo cancelers 128, 126 on the line and phone sides, respectively, and an otherwise conventional CIDCW CAS tone functional block 140.

The line-side codec 124 converts or digitizes the analog signal from the telephone line passed through the line-side TLI 506 into a digital signal. The line-side codec 124 also converts a digital signal from the DSP 120 into an analog signal for output on the line out 114 to the line-side TLI 506, which is transmitted on the telephone line to the central office 504. Similarly, the phone-side codec 122 digitizes the analog signal from the microphone of the telephone 502 into a digital signal for use by the DSP 120, and converts the digital signal output from the DSP 120 to the speaker out line 112 for output by the speaker or earpiece of the telephone 502. The line-side codec 124 and the phone-side codec 122 may employ any appropriate conventional encoding routine, e.g., PCM, ADPCM, $\mu$-law, A law or sigma-delta modulation.

The CIDCW receiver 102 further includes a line-side hybrid echo canceler (HEC) 128 to suppress the reflected signal with respect to signals passing through the line-side TLI 506, and a phone-side HEC 126 to suppress the reflected signal with respect to signals passing through the phone-side TLI 104. The line-side HEC 128 and the phone-side HEC 126 are conventional adaptive HECs which are trained with an input signal. Adaptive HECs such as the line-side HEC 128 and phone-side HEC 126 are known.

The line-side TLI 506 and the phone-side TLI 104 provide a given amount of trans-hybrid loss and thus an amount of suppression, e.g., 6 decibels (dB) of suppression, to a looped back, reflected or echoed signal. To further suppress the affects of signals reflecting from the line-side TLI 506 and phone-side TLI 104, the line-side HEC 128 and the phone-side HEC 126 each provide an additional amount of suppression. Increased suppression of reflected signals is particularly important for the reception of call related information because of potential disruption of call related information on a telephone line, e.g., CAS tones and/or FSK data, to provide sufficiently accurate and reliable results. Thus, the line-side TLI (hybrid) 506 and the phone-side TLI (hybrid) 104 together with the line-side HEC 128 and the phone-side HEC 126 can provide, e.g., a total of 12 dB of suppression of their respective reflected signals to allow for more reliable and accurate CIDCW call related information reception.

It is important to note that conventional adjunct CIDCW receiver units do not include any HEC. This is because an adjunct CIDCW receiver unit does not receive a separate signal, e.g., a separate microphone and/or speaker signal to train an adaptive HEC. By providing an adjunct CIDCW receiver unit which includes two TLIs 506, 104 for series connection between the central office 504 and the telephone 502, the CIDCW receiver 102 in accordance with the principles of the present invention receives suitable signals for training adaptive HECs, which suppress unwanted reflections and signals and thus improve the overall quality of the received and analyzed CIDCW signal.

The CIDCW CAS tone functional block 140, the line-side HEC 128 and/or the phone-side HEC 126 may be implemented in one or more software routines operated by a processor, e.g., a digital signal processor (DSP) 120. In the disclosed embodiment, the line-side HEC 128 and the phone-side HEC 126 are separate routines in the DSP 120. Of course, the use of more than one processor, and/or the use of other types of processors other than a DSP (e.g., a microprocessor and/or a microcontroller) are within the principles of the present invention. Moreover, the use of HECs separate from the DSP 120 is also within the principles of the present invention.

The phone-side TLI 104 functions as a 'line simulator', i.e., it mimics the telephone line from the central office 504 for the benefit of the customer premises equipment or telephone 502. AC modulation is provided by the phone-side codec 122 through the phone-side TLI 104, and DC current is provided to the telephone 502 via a current source 106. In the disclosed embodiment, the current source 106 provides about 20 milliamps (mA) current as a minimum, and normally between about 30 to 40 mA, e.g., 35 mA, of current to the telephone 502.

The series connection of the adjunct CIDCW receiver unit 100 between the telephone line from the central office 504 and the customer premises equipment, e.g., telephone 502 allows full control of the signals passing through the four nodes 110, 112, 114 and 116 corresponding to the phone-side TLI 104 and the line-side TLI 506, respectively. Thus, for instance, the microphone signal and/or earpiece or speaker signals of the telephone 502 can be disconnected, muted or suppressed at any time, e.g., under the control of the DSP 120.

Figure 3:
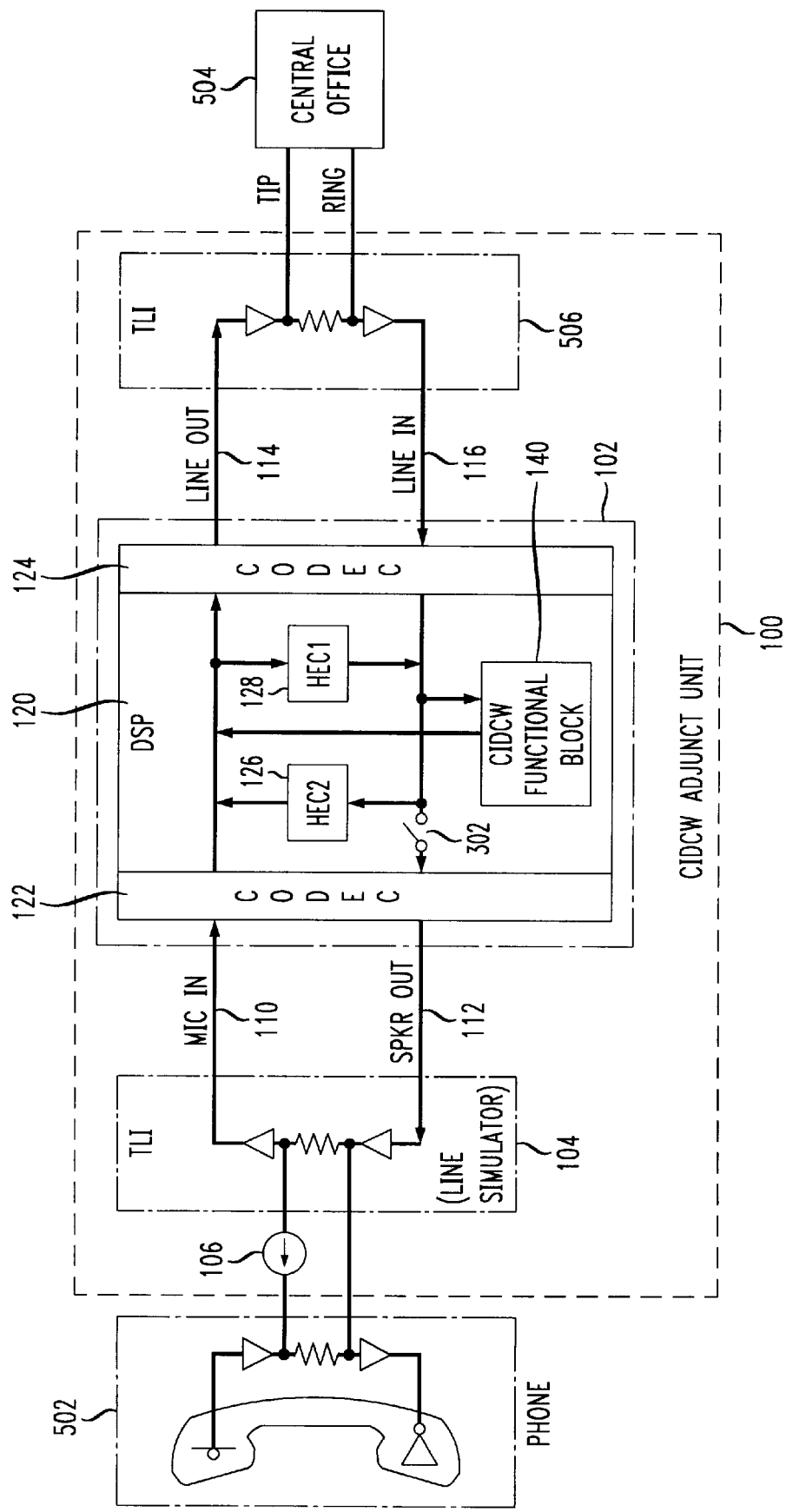
FIG. 3 depicts the addition of an HEC to suppress the microphone signal from the telephone, and an example location for disconnection of the speaker signal from the telephone, in accordance with the principles of the present invention.
Figure 4:
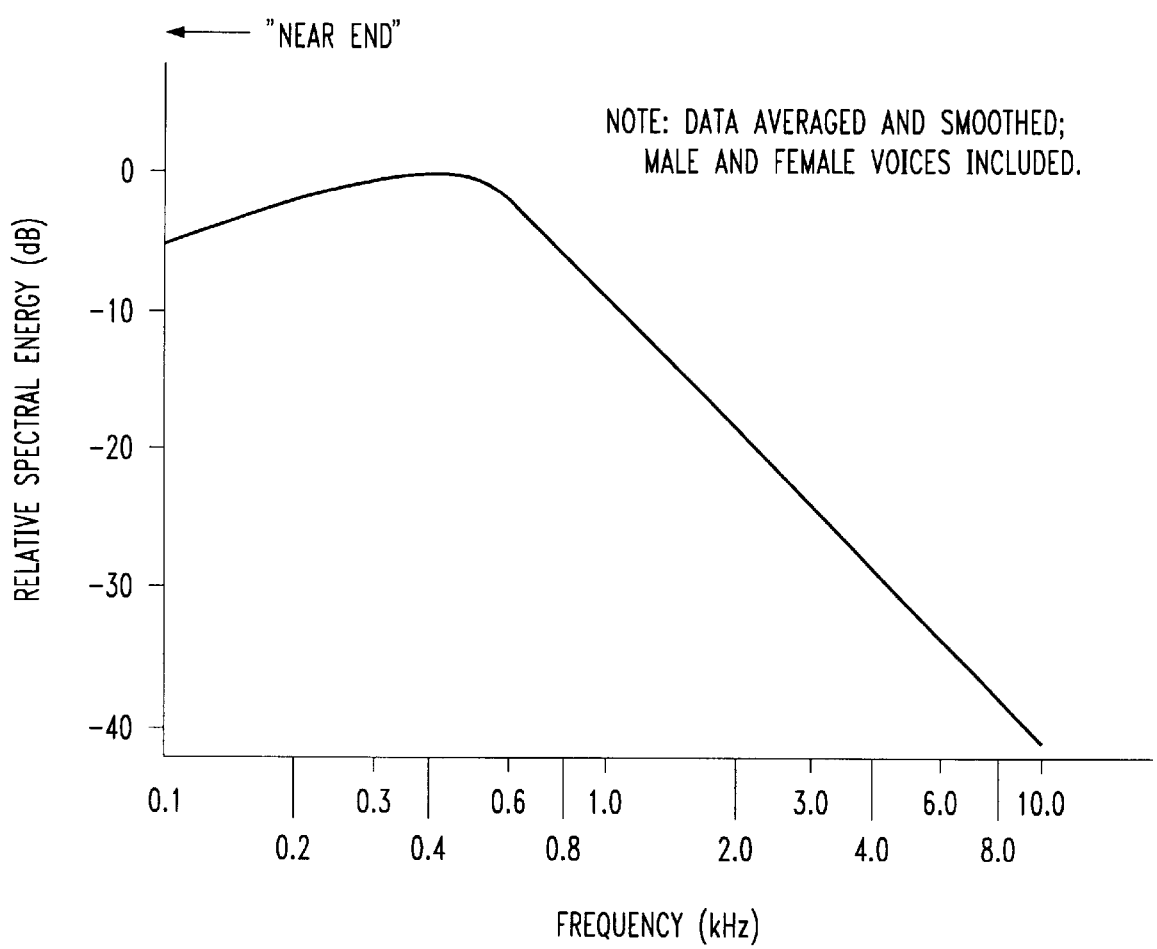
FIG. 4 shows the approximate long term average spectral energy density for continuous speech.
Figure 5:
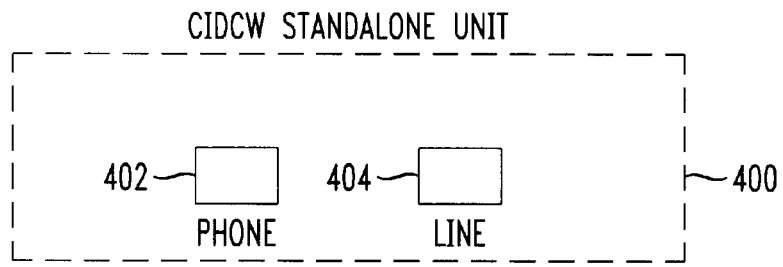
FIG. 5 shows the RJ-11 type connections for the telephone line and customer premises equipment in a conventional adjunct CIDCW receiver unit.
Figure 6:
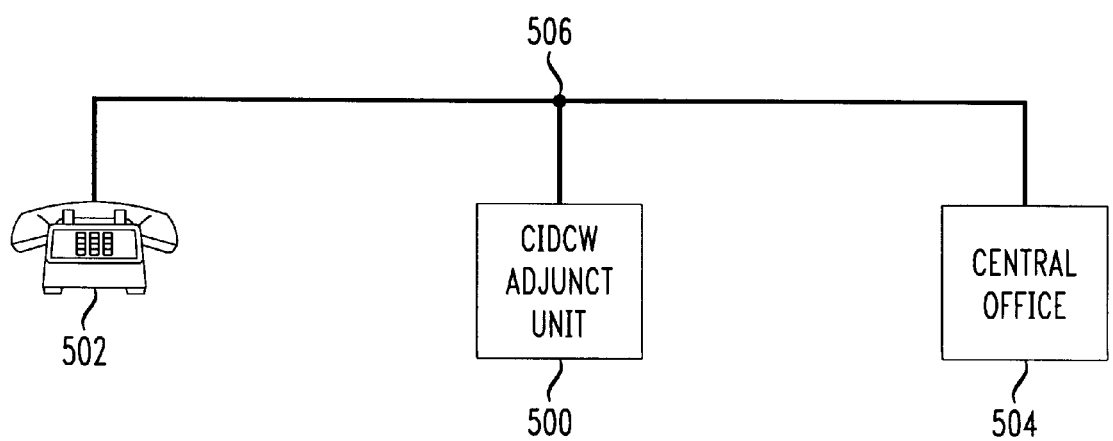
FIG. 6 shows the electrical connection of the telephone line between the central office and the customer premises equipment with a conventional adjunct CIDCW receiver unit.
Figure 7:
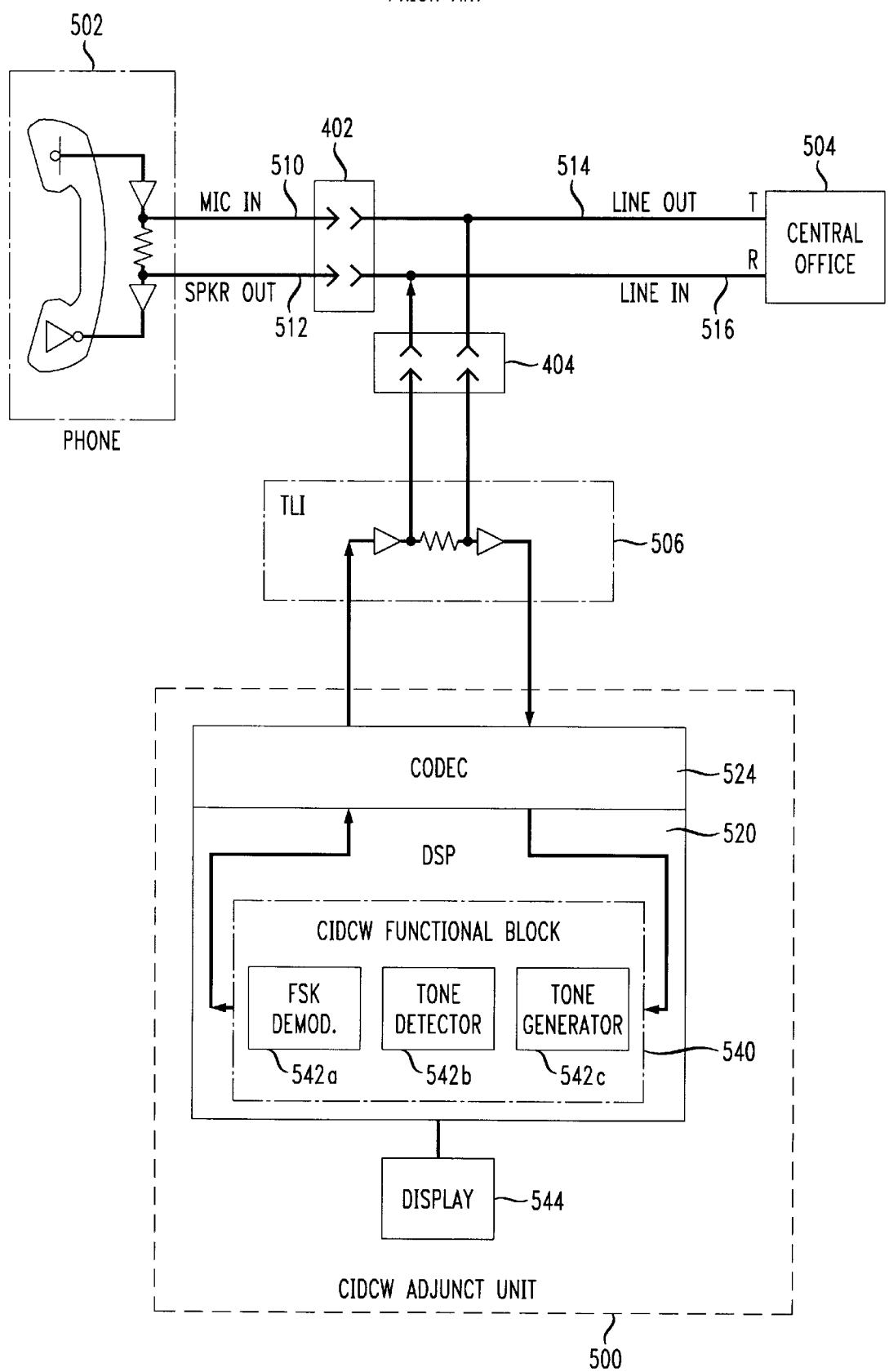
FIG. 7 shows the conventional adjunct CIDCW receiver unit of FIG. 6 in more detail.

FIG. 3 depicts the addition of an HEC function to suppress the microphone signal from the telephone 502, and an example location for disconnection of the speaker signal from the telephone 502.

In particular, FIG. 3 shows that the function of the HEC2 126 on the phone side of the CIDCW receiver 102 additionally suppresses the microphone signal from the telephone 502. This additional HEC function provides continual suppression of the microphone signal from the signal input to the CIDCW functional block 140 and eliminates the need to mute or disconnect the microphone signal from the telephone 502. The suppression of the microphone signal using an additional HEC function is discussed in detail in co-pending and co-owned U.S. application Ser. No. 08/991, 482, entitled "Performance Enhancement of Tone Detection and FSK Detection Using Hybrid Echo Cancellation", filed on Dec. 16, 1997. The disclosure of U.S. application Ser. No. 08/991,482 is explicitly incorporated herein by reference.

Because the microphone signal is continually suppressed from the signal received by the CIDCW functional block 140, the microphone path need not be disconnected as in other conventional CIDCW devices. The path of the speaker is preferably disconnected at any point within the DSP 120, as depicted by a 'switch' 302 in FIG. 3. Of course, it will be appreciated that the path of the speaker signal from the telephone 502 can be disconnected at other point(s) within the CIDCW receiver unit 100. For instance, the disconnection can be performed by the phone-side codec 122, at the line-side of the phone-side TLI 104, and/or at the phone-side of the phone-side TLI 104.

The switch 302 is shown for illustration purposes only. The disconnection(s) of the speaker path may be accomplished by any suitable mechanism (software or hardware) which prevents the digital or analog signal from reaching the normal destination. Moreover, the present invention is applicable even if the speaker signal is not broken or affected at all.

There are many benefits to employing an adjunct CIDCW receiver unit 100 as disclosed. The suppression of the signal from a microphone of the customer premises equipment is just one example of the applications of the present invention having particular use in preventing the disruption of a signal input to a call information receiver. The present invention allows accurate and reliable detection of call related information, e.g., an alerting CAS tone and/or FSK data, and improved talkdown and talkoff performance. Moreover, with the use of a hybrid echo canceller to suppress the microphone input, the complications of muting or disconnecting the microphone at the customer premises equipment are eliminated.

While the invention has been described with reference to the exemplary preferred embodiments thereof, those skilled in the art will be able to make various modifications to the described embodiments of the invention without departing from the true spirit and scope of the invention.

We claim:

1. A call related information receiver unit inserted in series between a telephone line from a central office and an associated customer premises equipment comprising:
    a call related information processor adapted to receive call related information;
    a first telephone line interface adapted to interface said call related information processor to a customer premises equipment associated with said adjunct call related information receiver unit;
    a second telephone line interface adapted to interface said call related information processor to a central office; and
    a first hybrid echo canceler adapted to suppress signals relating to at least one of said first telephone line interface and said second telephone line interface containing call related information.

2. The call related information receiver unit according to claim 1, further comprising:
    a second hybrid echo canceler adapted to suppress signals relating to the other of said first telephone line interface and said second telephone line interface.

3. The call related information receiver unit according to claim 1, wherein:
    said call related information is caller ID information.

4. The call related information receiver unit according to claim 1, further comprising:
    a hybrid echo canceler adapted to suppress signals relating to a microphone signal of a customer premises equipment associated with said adjunct call related information receiver unit.

5. The call related information receiver unit according to claim 1, wherein said call related information processor comprises:
    a digital signal processor.

6. The call related information receiver unit according to claim 1, wherein:
    said call related information processor is adapted to disconnect a disconnectable path of a microphone signal from a customer premises equipment associated with said adjunct call related information receiver during a reception of call related information.

7. The call related information receiver unit according to claim 6, wherein:
    said disconnectable path is within said call related information processor.

8. The call related information receiver unit according to claim 6, further comprising:
    a codec to digitize a microphone signal from a customer premises equipment associated with said adjunct call related information receiver;
    said disconnectable path being within said codec.

9. The call related information receiver unit according to claim 6, wherein:
    said disconnectable path is between said first telephone line interface and said call related information processor.

10. The call related information receiver unit according to claim 6, wherein:
    said disconnectable path is between said customer premises equipment and said first telephone line interface.

11. The call related information receiver unit according to claim 1, wherein:
    said call related information receiver unit is adjunct to said customer premises equipment.

12. The call related information receiver unit according to claim 1, wherein:
    said second telephone line interface is adapted to interface said call related information processor to a telephone line from a central office.

13. The call related information receiver unit according to claim 1, wherein:
    said first telephone line interface is adapted to interface said call related information processor to a customer premises equipment associated with said adjunct call related information receiver unit; and
    said second telephone line interface is adapted to interface said call related information processor to a telephone line from a central office.

14. A method of receiving call related information in a call related information receiver, said method comprising:
    inserting said call related information receiver in series between a telephone line from a central office and an associated customer premises equipment;
    canceling a signal relating to said customer premises equipment from a signal containing call related information received from said telephone line; and
    receiving said call related information in a call related information processor;
    wherein said canceling is performed with a hybrid echo canceler.

15. The method of receiving call related information in a call related information receiver according to claim 14, further comprising:

interfacing said call related information receiver to said customer premises equipment with a first telephone line interface.

16. The method of receiving call related information in a call related information receiver according to claim 15, further comprising:

interfacing said call related information receiver to said telephone line from said central office with a second telephone line interface.

17. The method of receiving call related information in a call related information receiver according to claim 14, further comprising:

interfacing said call related information receiver to said telephone line from said central office with a telephone line interface.

18. Apparatus for receiving call related information in a call related information receiver circuit, comprising:

means for inserting said call related information receiver circuit in series between a telephone line from a central office and an associated customer premises equipment;

means for canceling a signal from said customer premises equipment from a signal containing call related information received from said telephone line;

means for receiving said call related information in a call related information processor;

wherein said means for canceling comprises a hybrid echo canceler.

19. The apparatus for receiving call related information in a call related information receiver according to claim 18, further comprising:

means for interfacing said call related information receiver to said customer premises equipment with a first telephone line interface.

20. The apparatus for receiving call related information in a call related information receiver according to claim 19, further comprising:

means for interfacing said call related information receiver to said telephone line from said central office with a second telephone line interface.

21. The apparatus for receiving call related information in a call related information receiver according to claim 18, further comprising:

means for interfacing said call related information receiver to said telephone line from said central office with a telephone line interface.

22. The apparatus for receiving call related information in a call related information receiver according to claim 18, wherein:

said apparatus is adjunct to said customer premises equipment.

\* \* \* \* \*